June 26, 1923. 1,460,249

H. P. KRAFT

PRESSURE GAUGE

Filed May 2, 1919

WITNESS:
Rene' Breine

INVENTOR:
Henry P. Kraft,
By Attorneys,
Fraser, Turk & Myers

Patented June 26, 1923.

1,460,249

UNITED STATES PATENT OFFICE.

HENRY P. KRAFT, OF RIDGEWOOD, NEW JERSEY.

PRESSURE GAUGE.

Application filed May 2, 1919. Serial No. 294,267.

*To all whom it may concern:*

Be it known that I, HENRY P. KRAFT, a citizen of the United States of America, residing at Ridgewood, in the county of Bergen and State of New Jersey, have invented certain new and useful Improvements in Pressure Gauges, of which the following is a specification.

This invention relates to pressure gauges, and aims to provide certain improvements therein.

The invention is particularly directed to a gauge for measuring air pressures, such as in pneumatic tires or the like, and more especially to the type of gauge wherein means are provided for holding the indication after the pressure is removed from the gauge. The invention is best applied to a gauge of the dial type operated by a Bourdon tube or equivalent mechanism, the dial or hand being rotated by the tube, and left in its indicating position after the tube is retracted.

The invention provides a simple and effective method of holding the indicator in its indicating position and of restoring the same for the purpose of resetting the gauge. The invention also includes certain other features of improvement which will be hereinafter more fully described.

Referring to the drawings, which illustrate one form of the invention,—

Figure 1:
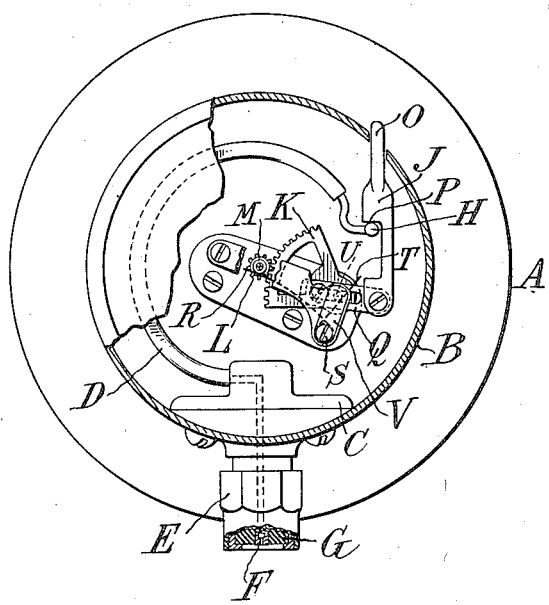
Figure 1 is a face view of the gauge with the dial broken away to disclose the operative parts.
Figure 2:
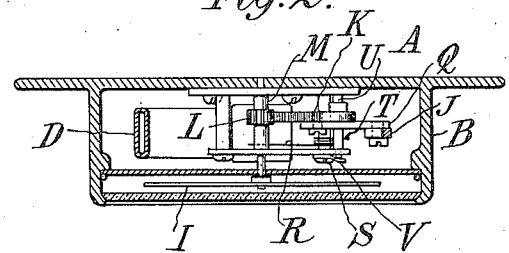
Fig. 2 is a cross-sectional view of the parts shown in Fig. 1.

Referring to the drawings, let A indicate the gauge as a whole which is shown as comprising a casing B preferably circular in form, on the inside of which is mounted a block or base C which is adapted to support the Bourdon tube D. Connected with the block or base C is a foot E which extends downwardly below the exterior of the casing and which is provided with some form of connection, by means of which it may be attached to the chamber whose pressure is to be ascertained. For use in connection with tires or similar devices the foot E contains a deflating pin F adapted to unseat the check of the tire valve and a packing G which is adapted to make a tight joint with the end of the tire valve casing when the gauge is pressed thereon. A continuous passage is provided through the deflator up to the interior of the tube D.

According to the present invention a connection is formed between the end H of the tube D and the rotary hand I, which preferably includes the resetting device J. In the construction illustrated this resetting device is in the form of a link, one end of which is connected with the usual sector K which meshes with the pinion L fixed on the pointer shaft or arbor M. The other end is preferably extended up through the casing and formed with a push handle O. The end H of the Bourdon tube engages a shoulder P formed on the part J, with the result that as the tube straightens under pressure, the part J is raised, thereby moving the sector, and rotating the shaft M and hand I. When pressure is removed from the gauge the tube contracts, thus leaving the resetting member J, together with the sector, pinion, shaft and hand in the positions to which they have been moved by the pressure. To reset the hand, it is only necessary to push inwardly on the handle O which will rotate the sector, pinion and hand in the reverse direction until the zero position is reached. This also restores contact between the contracted tube and the shoulder P, so that the gauge is then ready for a succeeding operation.

Figure 3:
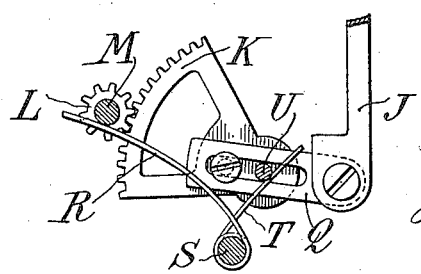
Fig. 3 is an enlarged view of some of the working parts.

In Fig. 3 is illustrated in detached condition the actuating mechanism, including the lower part of the resetting member, the sector and pinion. By reference to this construction it will be seen that the resetting mechanism is preferably not connected directly to the sector, but is pivoted to an arm Q, the opposite end of which has an adjustable connection with the sector, as by a slot formed in one of the parts through which a set screw passes. By this means the necessary adjustments in assembling and use can be easily made.

To introduce a frictional hold upon the mechanism, so that the actuating parts retain their position to which they have been moved by the pressure, there is preferably provided a spring R which is fixed to a post S, and which bears against the shaft M of the pinion L. This forms a simple and effective method of retaining the hand in its indicating position. A similar spring T may also be provided which bears against the side of the sector pivot or post U. Preferably a single spring is utilized for both purposes, as shown. The spring T also secures a frictional hold upon the pivot U and assists in preventing displacement of the working parts after the pressure is released from the gauge. A flat spring V is preferably secured to the post S, and bears against the top of the post U for the same purpose.

While I have shown and described one form of the invention, it will be understood that I do not wish to be limited thereto, since various changes may be made therein without departing from the spirit of the invention.

What I claim is:—

1. A pressure gauge having a rotary indicating member, pressure responsive means, a sector cooperating with said means for rotating said member, means for maintaining said member in pressure indicating position, and manually operable means permanently connected to said sector and extending to the exterior of the gauge for resetting said indicating member.

2. A pressure gauge having a rotary indicating member, pressure responsive means, a sector cooperating with said means for rotating said member, means for maintaining said member in pressure indicating position, and means permanently connected to said sector for manually resetting said indicating member, the pressure responsive means comprising a Bourdon tube, the free end of which engages the resetting device to move it in one direction.

3. A pressure gauge or the like, comprising a rotary indicating member, a Bourdon tube, a sector cooperating with said tube for rotating said indicating member, and a manually operable resetting device extending to the exterior of the gauge, and provided with a shoulder adapted to be engaged by the free end of the Bourdon tube to move the resetting device outwardly, said resetting device being operatively connected with the sector for moving the same.

4. A pressure gauge or the like, having a rotary indicating member, a Bourdon tube and means associated therewith for rotating the indicating member, said means comprising a link extending to the exterior of the gauge and provided with a shoulder adapted to be engaged by the free end of the Bourdon tube, said link having a manually-operating portion for resetting the indicating member.

5. A pressure gauge, or the like, having an indicating member, means for retaining said member in indicating position, a resetting device, and pressure responsive means operating upon said indicating member through said resetting device.

6. A pressure gauge or the like, having a rotatable indicating member, means for retaining said member in indicating position after the pressure is released from the gauge, means comprising a resetting device for rotating the indicating member and pressure responsive means operable upon the means for rotating the indicating member to rotate the same.

7. A pressure gauge, or the like, having an indicating member, a sector, a resetting device, and pressure responsive means operating upon said indicating member through said resetting device and sector, and a single spring directly acting against said indicating member and said sector to retain the indicating member in pressure indicating position after the pressure is released from the gauge.

In witness whereof, I have hereunto signed my name.

HENRY P. KRAFT.